June 16, 1936. H. W. MACPHERSON 2,044,437
AUTOMATIC VALVE CONTROL MECHANISM FOR FLUID DISTRIBUTING SYSTEMS
Filed May 18, 1934 6 Sheets-Sheet 1

INVENTOR
H. W. MACPHERSON
BY J. D. O'Connell
ATTORNEY

June 16, 1936.    H. W. MACPHERSON    2,044,437
AUTOMATIC VALVE CONTROL MECHANISM FOR FLUID DISTRIBUTING SYSTEMS
Filed May 18, 1934    6 Sheets-Sheet 2

INVENTOR
H.W. MACPHERSON
BY J.D.O'Connell
ATTORNEY

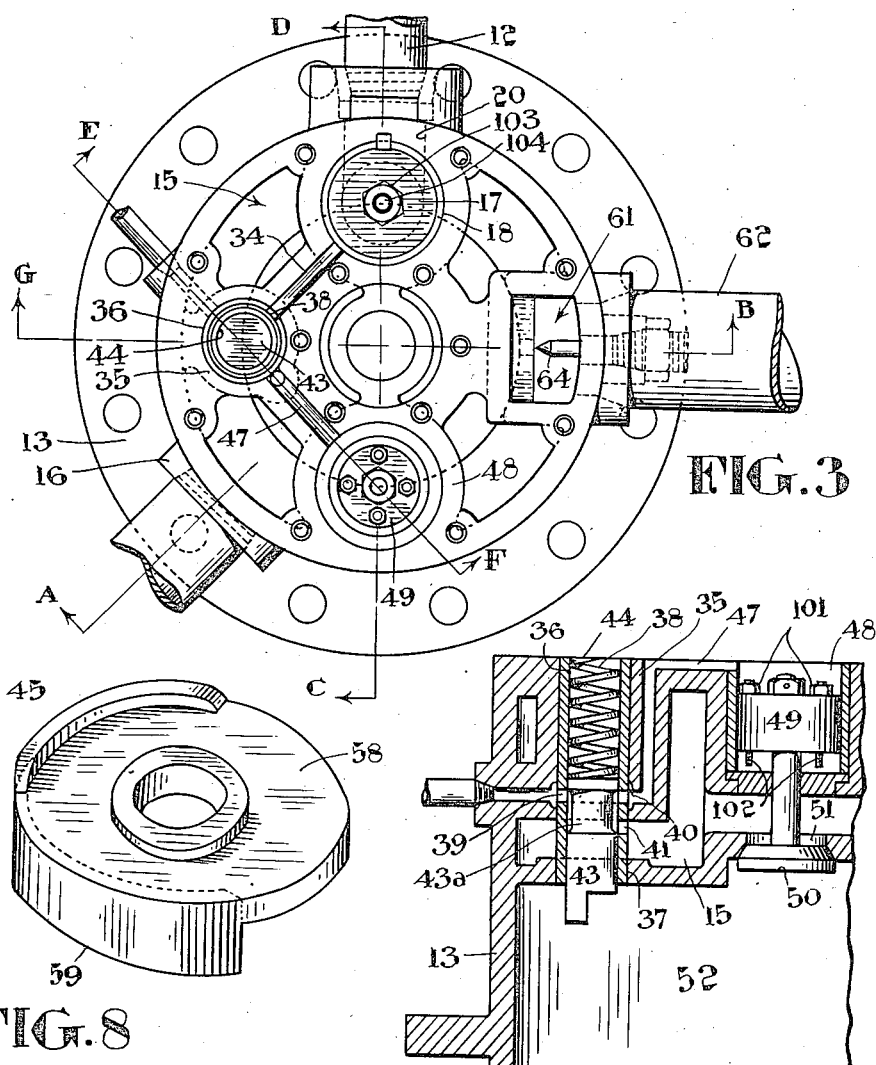
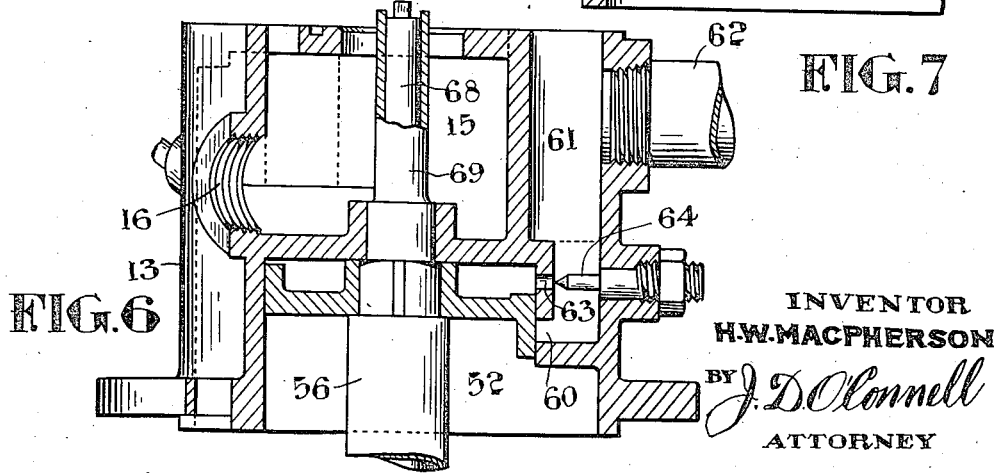

June 16, 1936.   H. W. MACPHERSON   2,044,437
AUTOMATIC VALVE CONTROL MECHANISM FOR FLUID DISTRIBUTING SYSTEMS
Filed May 18, 1934   6 Sheets-Sheet 5

INVENTOR
H.W. MACPHERSON
BY J.D. O'Connell
ATTORNEY

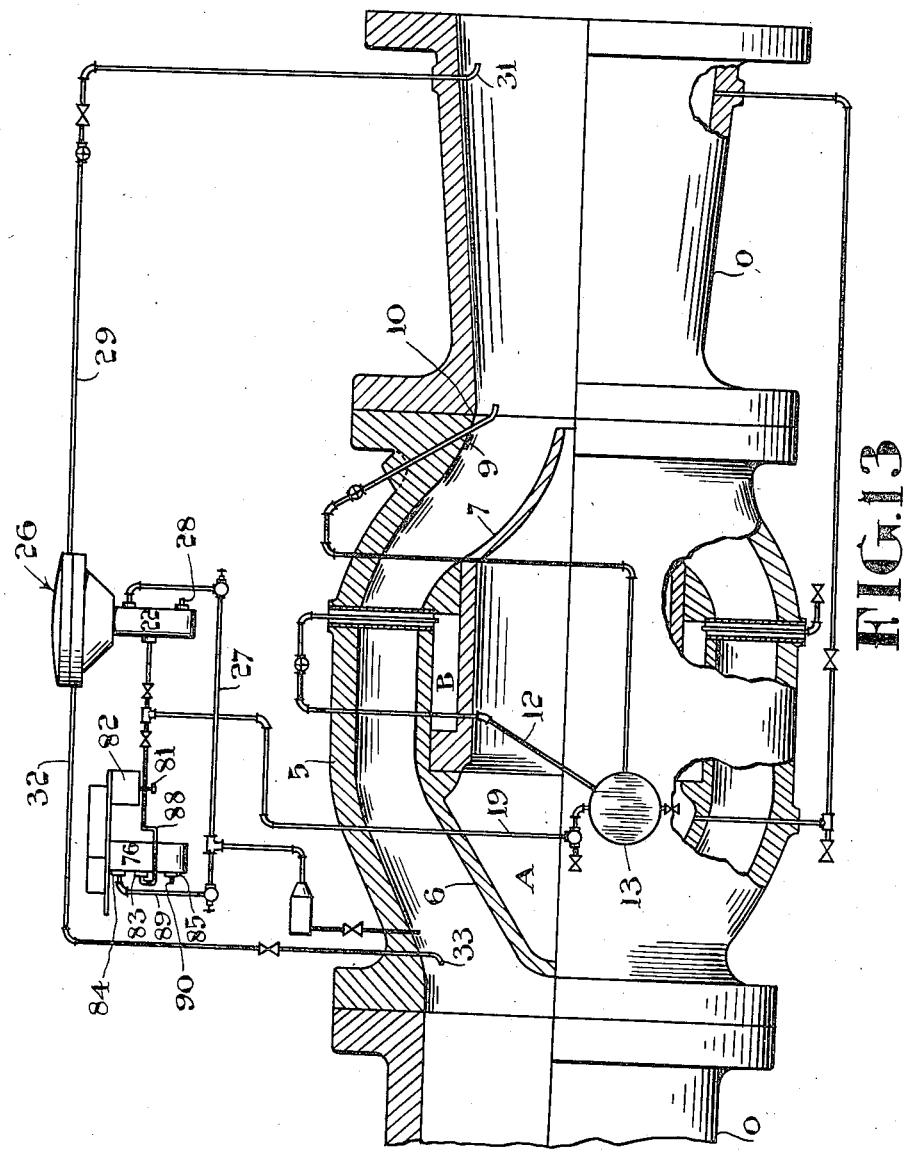

Patented June 16, 1936

2,044,437

UNITED STATES PATENT OFFICE 2,044,437

AUTOMATIC VALVE CONTROL MECHANISM FOR FLUID DISTRIBUTING SYSTEMS

Hugh W. Macpherson, Montreal, Quebec, Canada, assignor to Dominion Engineering Works Limited, Lachine, Quebec, Canada Application May 18, 1934, Serial No. 726,353

19 Claims. (Cl. 137—139)

This invention relates to fluid distributing systems and particularly to an improved control mechanism for valves installed in fluid distributing mains or feeders. The principal object is the provision of a simple, practical and reliable control mechanism which is useful wherever efficient service requires full automatic opening or closing of a pipe line valve in response to a change in pressure or flow conditions within the region of the valve or in response to current flow or interruption of current flow in the circuit of an electric motor driving a pump that delivers through the valve.

While capable of wider application the control mechanism of the present invention is particularly useful in connection with installations where a valve of the fluid operated plunger type is installed in the discharge line leading from a centrifugal pump to a storage reservoir. In such installations it is desirable that full opening of the valve take place when full shut-off pressure is established at the intake end of the valve by the starting of the pump. It is also desirable that full closure of the valve be effected in a quick and positive manner to check reverse flow caused by stoppage of the pump or by a break in the pipe line between the pump and the valve. The control mechanism of the present invention adequately meets these requirements. It acts in direct response to the establishment of pressure at the intake end of the valve or to the closure of the motor circuit to automatically relieve pressure in the valve closing chamber to atmosphere while establishing pipe line pressure in the valve opening chamber so that the plunger of the valve is thus forced to a fully open position. It also acts in direct response to an excessive pressure drop at the intake end of the valve or in response to current failure in the motor circuit to automatically relieve pressure in the valve opening chamber while establishing pipe line pressure in the valve closing chamber to thus effect a relatively quick and positive closing of the plunger against reverse flow. Means are also embodied in the control mechanism for varying the rate at which the plunger is moved to its open and closed positions and for slowing down the final part of the closing stroke with respect to the remainder of the stroke to suit pipe line conditions and to avoid excess pressure rise due to a too rapid seating of the plunger.

Proceeding now to a more detailed description reference will be had to the accompanying drawings, wherein—

Fig. 3 is a top plan view of the control-valve housing appearing in Fig. 2. In this view the cover of the control valve casing is omitted to expose underlying parts.

Fig. 6 is a vertical sectional view along the line A—B in Fig. 3.

Fig. 7 is a vertical sectional view along the line E—F in Fig. 3.

Fig. 8 is a perspective view of a combined cam and valve member which operates within the control-valve housing.

Fig. 13 is a view similar to Fig. 1 but showing a modified control mechanism.

Figure 1:
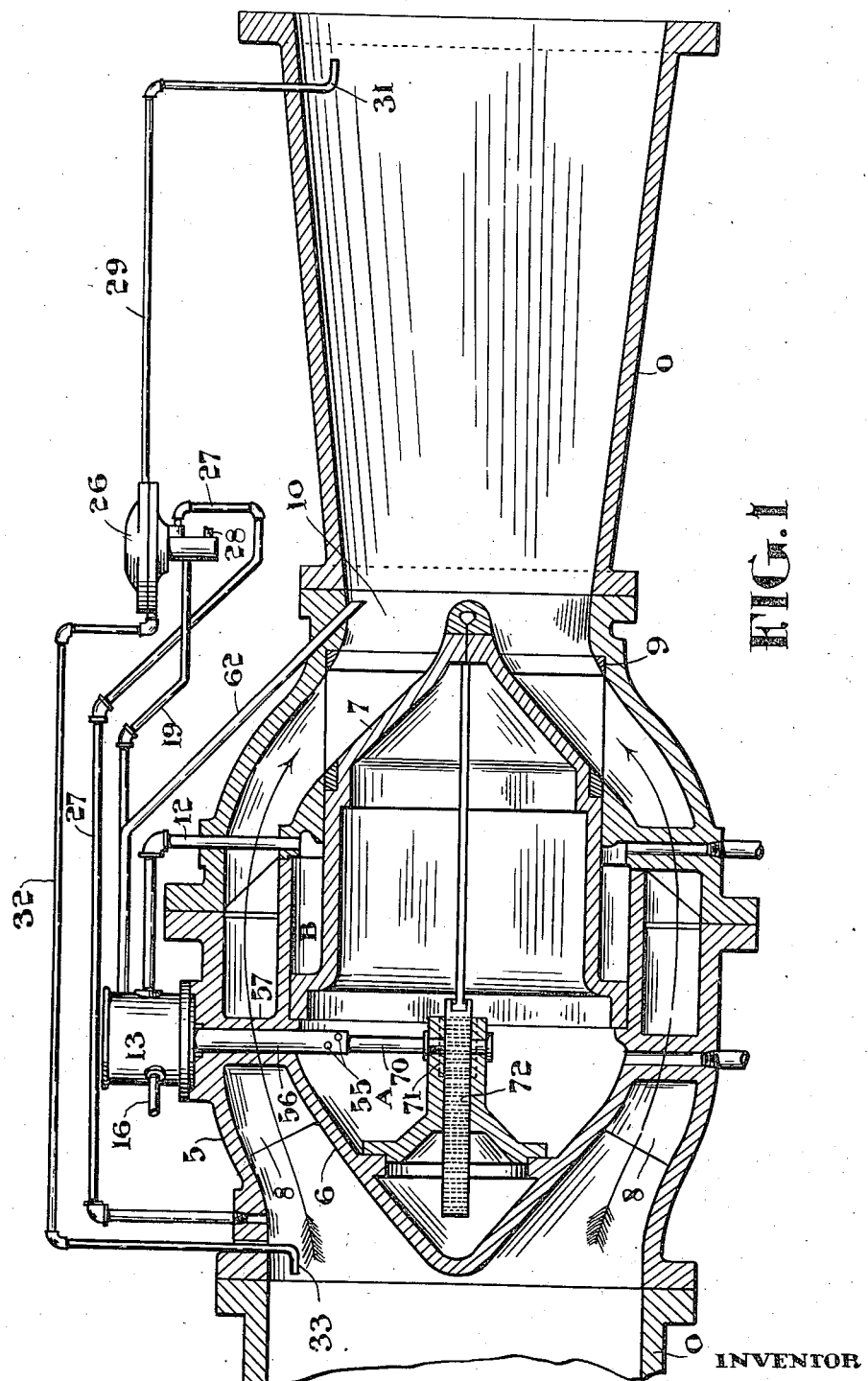
Fig. 1 is a vertical sectional view of a pipe line including a pressure operated plunger valve equipped with one form of automatic control mechanism designed in accordance with the present invention.

In these drawings the automatic control mechanism is shown applied to a well known type of fluid operated plunger valve included in a pipe line O representing the discharge line leading from a centrifugal pump to a storage reservoir. This valve comprises a valve body 5 surrounding an internal cylinder 6 in which a plunger 7 is slidably arranged. The cylinder is closed at one end and spaced from the valve body by radial ribs 8. The plunger 7 forms, in conjunction with the cylinder, two operating chambers A and B and is adapted to close against a seat 9 arranged in the restricted neck portion 10 of the valve body. The plunger is moved to a valve closing position by establishing pipe line pressure in the central chamber A and relieving pressure in chamber B to atmosphere. Movement of the plunger to a valve opening position is accomplished by establishing pipe line pressure in chamber B and relieving pressure in chamber A to atmosphere.

Figure 12:
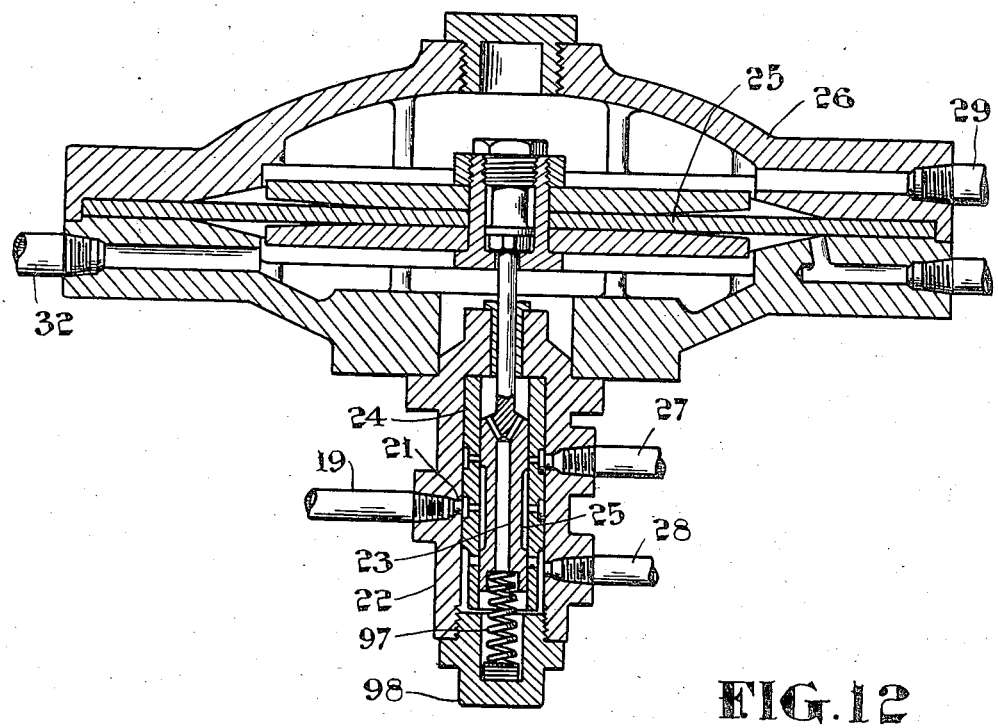
Fig. 12 is a vertical sectional view of a diaphragm operated pilot valve that controls the action of certain of the valves operating in the control-valve housing.

In describing the manner in which the pressures in chambers A and B are controlled to effect full automatic opening or closing of the valve in accordance with the present invention reference will be had initially to the construction shown in Figs. 1 to 12 inclusive. As here shown a pressure relief pipe 12 (Figs. 1, 3, 4 and 5) leads from the annular chamber B to a control housing 13 where it communicates with a port 14 (Fig. 5) leading to a drain chamber 15 provided with a drain outlet 16. The port 14 is controlled by a piston valve 17 working in a guide cylinder 18. A pressure supply and exhaust pipe 19 leads from a port 20 communicating with the upper end of the guide cylinder 18 to a port 21 provided in the valve casing 22 of a diaphragm operated pilot valve 23 (Fig. 12). The pilot valve 23 works in a liner 24 and is attached to a flexible diaphragm plate 25 contained in a housing 26. The pilot valve 23 and liner 24 are provided with co-operating ports arranged so that when the valve is raised to a predetermined position by upward movement of the diaphragm plate 25 the pipe 19 will be connected with a pressure supply pipe 27 leading to the upper portion of the valve casing 22 from the upstream side of the valve body 5 (see Fig. 1). When the pilot valve 23 is lowered to a predetermined position by downward movement of the diaphragm plate 25 the ports in the pilot valve and the liner 24 serve to connect the pipe 19 with a drain pipe 28. The space in the housing 26 above the diaphragm plate 25 is connected by a pipe 29 with the pump discharge line O at the downstream side of the main valve 5. The end of the pipe 29 disposed within the pipe line O presents an elbow 31 which registers minus velocity head when the flow is in the normal direction, and plus velocity head when the flow is in the reverse direction. The space in the housing 26 below the diaphragm plate 25 is connected by a pipe 32 with the upstream side of the valve body 5, the end of pipe 32 disposed within the valve body presenting an elbow 33 which registers plus velocity head when the flow through the valve is in the normal direction and minus velocity head when the flow is reversed.

It may be explained here that when full shut-off pressure is established at the intake end of the main valve (a condition which is brought about by the starting of the pump which delivers through the valve) the pressure supplied to the diaphragm housing 26 via pipe 32 is effective to lift the pilot valve 23 to a position establishing communication between the pipes 27 and 19 so that pipe line pressure is supplied through these pipes to the upper end of the guide cylinder 18 and serves to seat the plunger valve 17 against the pressure in the operating chamber B of the main valve. This cuts off the pressure relief connection between chamber B and the drain chamber 15 and causes pipe line pressure to be established in chamber B. At the same time pressure in chamber A is exhausted to atmosphere via the drain chamber 15 as hereinafter described so that the pipe line pressure which is established in the chamber B by the closure of valve 17 is effective to move the plunger 7 in the valve opening direction.

Figures 2, 4:
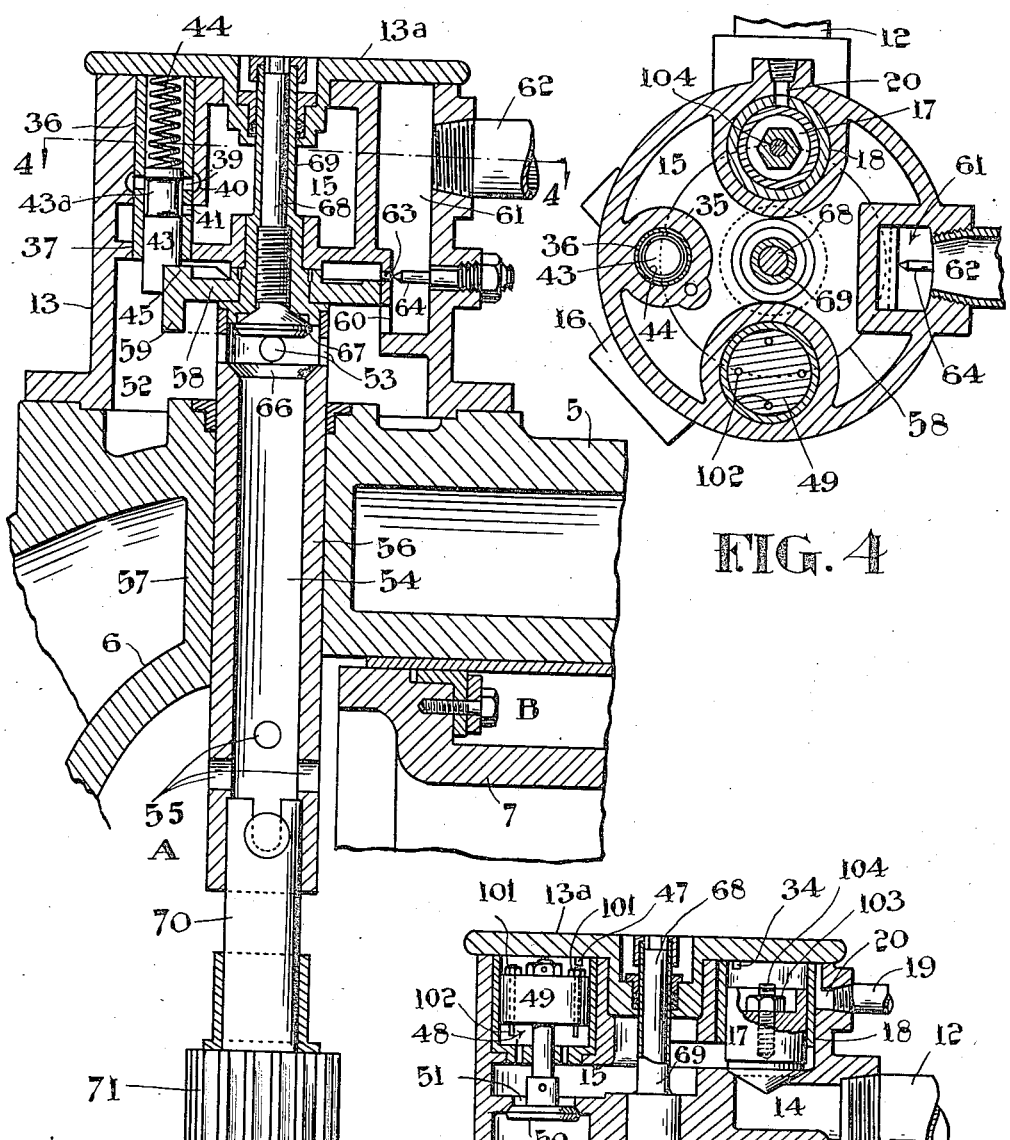
Fig. 2 is an enlarged view, mainly in vertical section, of a portion of the control mechanism including a control-valve housing mounted on the pipe line valve. The plane of the section shown in this figure is indicated by the line G—B in Fig. 3.
Fig. 4 is a horizontal sectional view of the control valve housing taken along the line 4—4 of Fig. 2.
Figure 5:
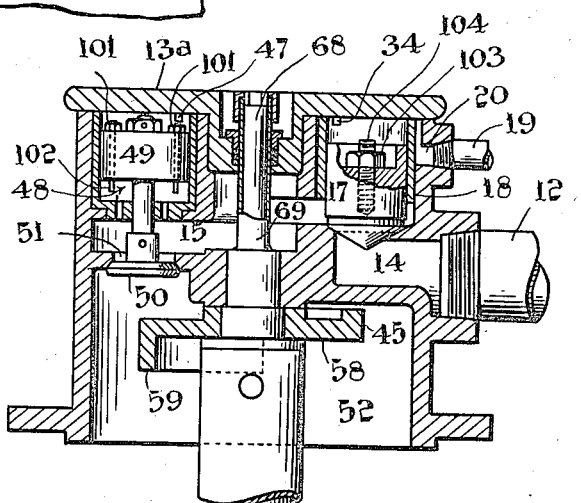
Fig. 5 is a vertical sectional view along the line C—D in Fig. 3.
Figure 9:
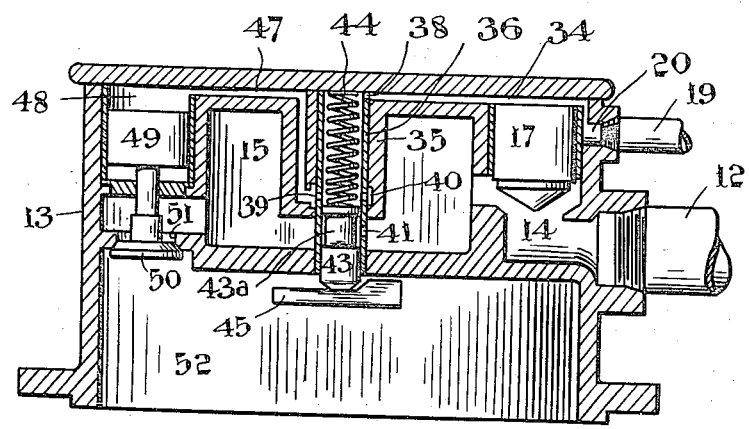
Figs. 9, 10 and 11 are diagrammatic sectional views illustrating the action of the control valves operating within the control-valve housing.

A port 34 (Figs. 3, 5 and 7) leads from the upper end of guide cylinder 18 to the upper end of a second guide cylinder 35 provided in the housing 13. A liner 36 is arranged in the guide cylinder 35 and projects downwardly below the same into an opening 37 in the bottom wall of the drain chamber 15. The liner 36 is provided with a series of vertically spaced ports including an upper port 38 communicating with the port 34; intermediate ports 39 communicating with an annular recess 40 in the lower portion of guide cylinder 35 and lower ports 41 communicating with the drain chamber 15. A distributing valve 43, working in the liner 36, is operated in a downward direction by a spring 44 and in an upward direction by a cam 45 (Fig. 2). When the distributing valve 43 is moved downwardly below the intermediate liner ports 39 the port 34 leading from guide cylinder 18 is connected with a port 47 leading from the recess 40 to the upper end of a guide cylinder 48 containing a piston 49. When the distributing valve 43 is moved upwardly to a position where its annular groove or port 43a is disposed opposite the intermediate liner ports 39, it will be seen that the port 47 connecting with the guide cylinder 48 is placed in communication with the drain chamber 15, thus relieving guide cylinder 48 of pressure previously admitted thereto from the port 34. The piston 49 carries a tappet valve 50 controlling an opening 51 connecting the drain chamber 15 with a chamber 52 formed in the lower portion of the housing 13. Chamber 52 is in constant communication with the operating or valve closing chamber A of the main valve 5 via the ports 53, bore 54 and ports 55 of a hollow rotary member 56. This member 56 (see Fig. 2) is rotatably mounted in a bearing 57 so that its upper end in which the ports 53 are formed projects into the chamber 52 while its lower end, in which the ports 55 are formed is disposed within the main valve chamber A. A plate 58, fixed to rotate with the upper end of member 56 carries the cam 45 which controls the positioning of the distributer valve 43. Plate 58 is also provided with a depending flange 59 which serves as a valve for controlling a relatively large port 60 through which fluid pressure is admitted to chamber 52 from a chamber 61 which is supplied with pressure by a pipe 62 leading from the low pressure region or restricted throat 10 of the valve body 5. Chamber 52 also communicates with the pressure supply chamber 61 via a relatively small port 63 controlled by a needle valve 64.

Immediately below the ports 53 the bore of the hollow rotary member 56 is shaped to provide a valve seat 66 against which a shut-off valve 67 is closed when it is desired to close off communication between the chamber 52 and the main valve operating chamber A. The shut-off valve 67 is provided with a valve stem 68 in threaded engagement with a stem guide 69 having its lower end fitted in the upper end of member 56 and its upper end fastened to the cover 13a of the control valve housing 13. A special tool (not shown) is employed to turn the stem 68 to seat and unseat the valve 67. At its lower end the hollow rotary member 56 is suitably coupled to the upper end of a spindle 70. The lower end of this spindle is attached to a pinion 71 driven by a rack 72 which is fixed to travel with the main valve plunger 7.

The functioning of the parts mentioned in the two preceding paragraphs will be clear from the following description of operation, it being assumed, for the purpose of such description, that the main valve is closed with full pipe line pressure beyond the valve and zero pressure at the intake or pump end. Under these conditions the pressure supplied to diaphragm casing 26, via pipe 29, is acting on the top of diaphragm plate 25 to hold the pilot valve 23 in a position connecting pipe 19 with drain pipe 28. In this position of the pilot valve 23 the upper ends of the cylinders 18 and 48 and the connecting parts 34 and 47 are connected to atmosphere via pipe 19, pilot valve 23 and pipe 28, it being assumed that the distributer valve 43 is in the position shown in Fig. 9. Owing to the absence of pressure in the upper end of cylinder 18 the valve 17 is opened by the pressure in pipe 12 with the result that the pressure admitted to the plunger opening chamber B of the main valve (by leakage between the cylinder 6 and the plunger 7) is relieved through pipe 12, port 14 and drain chamber 15 so that the pressure in chamber B is reduced to zero or thereabouts. Similarly, owing to the absence of pressure in the upper end of cylinder 48 the valve 50 is closed by the pressure existing in the chamber 52 of housing 13 and in the communicating plunger closing chamber A of the main valve, it being remembered that pressure is constantly admitted to said chambers 52 and A from the restricted throat 10 of the main valve casing 5 via pipe 62 and chamber 61. With the various valves positioned as here described it will be seen that the full restricted throat pressure of the pipe line will be established in chamber A to hold the plunger of the main valve in its closed position.

Figure 10:
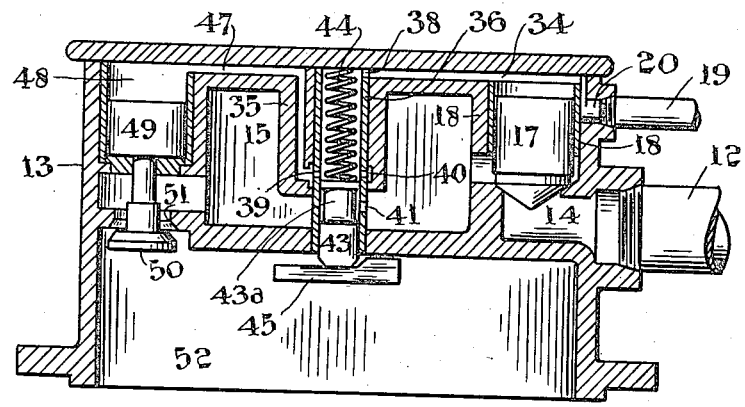
Figure 11:
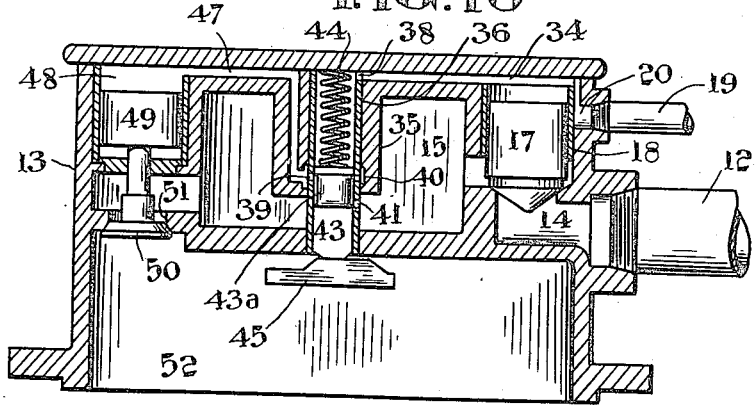

It will now be assumed that the pump which delivers through the pipe line is started and establishes full-shut pressure at the intake end of the main valve. The pressure supplied to the diaphragm casing 26, via pipe 32, will then act on the diaphragm plate 25 to lift the pilot valve 23 to a position connecting the pipe 19 with the pressure supply pipe 27 leading from the pipe line at the upstream or pump end of the main valve. The distributing valve 43 being in the position shown in Fig. 9 it follows that pressure is established in the upper ends of cylinders 18 and 48 to close the valve 17 and to open the valve 50 as shown in Fig. 10. The closure of valve 17 shuts off the pressure relief connection between the drain chamber 15 and the plunger closing chamber B of the main valve with the result that the full pump or pipe line pressure is now established in chamber B. The opening of valve 50 establishes a pressure relief connection between the drain chamber 15 and the plunger closing chamber A of the main valve with the result that the pressure in chamber A is lowered sufficiently to permit opening of the main valve plunger by the pressure in chamber B. During the opening movement of the plunger the rack 72 acts through the pinion 71 to rotate the hollow member 56 and the plate 58 which carries the cam 45 and the valve flange 59. The opening movement of the plunger continues until the cam 45 lifts the distributing valve 43 to the position shown in Fig. 11. When this occurs the valve 50 is permitted to close by reason of the fact that the pressure in the upper end of the cylinder 48 is relieved to atmosphere via ports 40, 39 and 41 and drain chamber 15. The result of this closing of valve 50 (which occurs at or near the wide open position of the main valve plunger) is that restricted throat pressure is again established in the chamber A to balance the hydraulic forces acting on the main valve plunger and bring it to rest in the open position.

It will now be assumed that, with the main valve open, a reversal of flow is caused by an operating condition, such as the stopping of the pump or by an emergency condition, such as a break in the pipe line between the pump and the main valve. In this case the pressure supplied through pipe 29 will act on the diaphragm plate 25 and the pilot valve 23 to connect the pipe 19 with the drain pipe 28. This relieves the pressure in cylinder 18 so that valve 17 opens to also relieve the pressure in chamber B to atmosphere via the relief connection previously described for this purpose. Since the supply of pressure to chamber A via pipe 62, chambers 60 and 52 and member 56 has not been interrupted it follows that the restricted throat pressure in chamber A is effective to automatically close the main valve plunger. During this closing of the plunger the cam 45 is rotated to permit the distributing valve 43 to return to the position shown in Fig. 9 but the valve 50 remains closed since the cylinders 48 and 18 and their connecting ports 47 and 34 are connected to atmosphere via pipe 19 and are therefore under zero pressure. Rapid closing movement of the plunger is effected by the pressure in chamber A until the plunger has completed about 75% of its closing stroke. At that time the plate 58, which is rotated through its drive connection with the plunger, reaches a position where the valve flange 59 shuts off the port 60 connecting chamber 61 and 52. From this point onward to the closed position of the plunger the valve closing pressure is supplied to the chamber A from chamber 60 solely through the relatively small throttled port 63 so that the closing stroke of the plunger is decelerated to prevent excess pressure rise.

Figure 14:
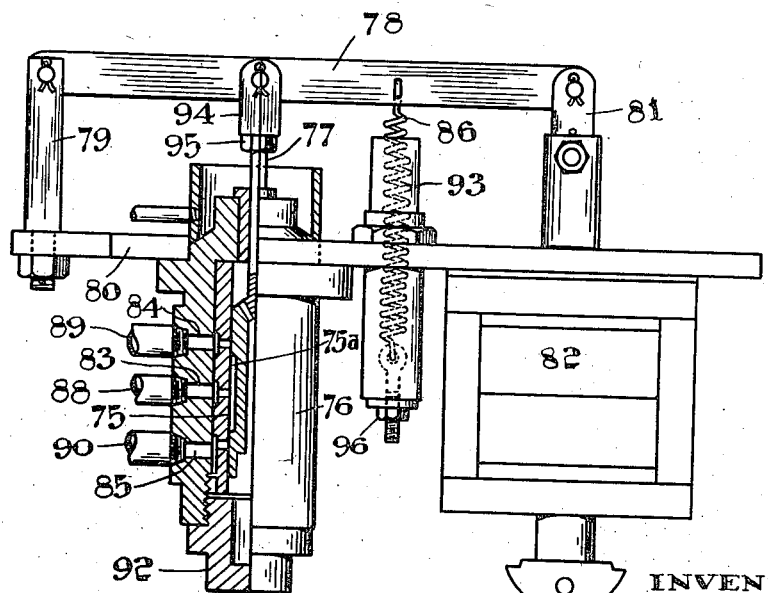
Fig. 14 is a view, partly in elevation and partly in vertical section, of a solenoid operated pilot valve included in the assembly of Fig. 13.

In cases where the water supply is furnished by an electric motor driven pump it is desirable to provide positive means for controlling the main valve independently of pressure and velocity changes in the pipe line in which the main valve is located. For example it is desirable to effect automatic opening of the main valve plunger as the circuit of the pump driving motor is closed and to effect automatic closure of the plunger in response to interruption of current to the pump driving motor. This may be conveniently accomplished by the solenoid operated control means appearing in Figs. 13 and 14. As shown more particularly in Fig. 14 a pilot valve 75, working in a cylinder 76, is suspended by its stem 77 from a vertically movable lever 78. One end of lever 78 is pivoted to a standard 79 rising from a supporting plate 80 to which the upper end of cylinder 76 is fastened. The other end of lever 78 is fastened to the movable core 81 of a solenoid 82. This solenoid which is also carried by the plate 80, is preferably of the single phase continuous duty type and is adapted to be connected across two leads of the pump driving motor so that, when the motor circuit is closed, the solenoid core 81 will move upwardly and lift the valve 75 to a position where the valve port 75a connects the cylinder ports 83 and 84. Upon interruption of current to the pump motor the solenoid core, due to its own weight and the action of a spring 86, will drop down and carry with it the pilot valve 75. By this downward movement of the pilot valve the valve port 75a is positioned to connect the cylinder ports 83 and 85. Pipes 88, 89 and 90 are respectively connected to the ports 83, 84 and 85 of the pilot valve cylinder 76. The pipe 88 is a branch of the previously mentioned pressure supply and exhaust pipe 19 which connects with the port 20 (Fig. 5) of the control valve housing 13. The pipe 89 is a branch of the previously mentioned pressure supply pipe 27 which connects with the downstream side of the valve body. The pipe 90 is a drain or atmosphere relief pipe. It will thus be apparent that the pilot valve 75 functions in the same manner as the previously mentioned pilot valve 23 except that it is operated by the solenoid 82 independently of pressure or velocity changes to which the valve 23 is responsive.

The travel of the solenoid core 81 is so adjusted that pipe 88 is connected to drain pipe 90 when the core is in the downward position. This is accomplished by the provision of a threaded sleeve 93 which serves as a stop for the lever 78 and is adapted to be screwed up or down to regulate the permissable downward travel of valve 75. Should this adjustment be insufficient a further adjustment may be made by reason of a threaded connection (not shown) between the pilot valve stem 77 and a fork member 94 which couples the stem to the solenoid lever 78. This last adjustment decreases or increases the effective length of stem 77 as will be readily understood. After such adjustment stem 77 is locked to the coupling fork 94 by a lock nut 95. The tension of the spring 86 may be varied by the adjusting nut 96 and is preferably equal to about one half the magnetic pull exerted by the solenoid.

The pilot valve 23 (Fig. 12) is also accurately positioned by regulating the compression of a spring 97 confined between the lower end of the valve and an adjusting member 98 in threaded engagement with the lower end of the valve housing 22

The rate of movement of the main valve plunger 7 during automatic opening may be regulated by loosening the nuts 101 and turning the adjusting screws 102 (Fig 5) to vary the effective stroke of the piston 49 and valve 50. Similarly, the rate of movement of the main valve plunger, during automatic closing, may be regulated by loosening the lock nut 103 and turning the adjusting screw 104 to increase or decrease the effective stroke or travel of the piston valve 17. The rate of final closing of the main valve plunger may also be regulated by adjustment of the needle valve 64 (Fig. 2).

Having thus described my invention, what I claim is:—

1. In a fluid distributing system the combination with a conduit equipped with a pressure operated plunger valve including valve opening and valve closing pressure chambers in which pressure is alternately established and relieved to control the opening and closing of the valve of automatic control means acting in response to the establishment of pressure at the intake end of the valve to relieve pressure in the valve closing chamber to atmosphere and to establish pipe line pressure in the valve opening chamber, said control means also acting in response to excessive pressure drop at the intake end of the valve to relieve pressure in the valve opening chamber to atmosphere and to establish pipe line pressure in the valve closing chamber.

2. A fluid distributing system as claimed in claim 1 in which the automatic control means includes a relief valve controlling a pressure relief connection communicating with the first mentioned chamber of the main valve, a second relief valve controlling a pressure relief connection communicating with the second mentioned chamber of the main valve and additional valve means through which pipe line pressure is applied to close the first mentioned relief valve and to open the second mentioned relief valve when the pressure at the upstream side of the main valve exceeds the pressure at the downstream side, the position of said relief valves being reversed when the pressure at the downstream side of the main valve exceeds the pressure at the upstream side.

3. In a fluid distributing system the combination of a conduit equipped with a main pressure operated valve including valve opening and valve closing pressure chambers, a first relief valve controlling a pressure relief connection communicating with the valve opening chamber, a second relief valve controlling a pressure relief connection communicating with the valve closing chamber and control means operating in response to establishment of pressure on the intake side of the main valve to close the first relief valve and to open the second relief valve, said control means also operating to close the second relief valve and to open the first relief valve to effect a closing movement of the main valve in response to the establishment of predetermined pressure or flow conditions in the conduit.

4. A fluid distributing system as set forth in claim 3 characterized in that said control means functions automatically, in response to excessive pressure drop on the intake side of the main valve, to open the first relief valve and to close the second relief valve.

5. A fluid distributing system as set forth in claim 3 characterized in that said control means functions automatically, in response to reversal of flow in said conduit, to open the first relief valve and to close the second relief valve.

6. In a fluid distributing system the combination of a conduit equipped with a pressure operated valve including valve opening and valve closing pressure chambers, a first pressure relief valve associated with the valve opening chamber and normally tending to open in response to the pressure in said chamber, a second pressure relief valve associated with the valve closing chamber and normally tending to close in response to the pressure in said chamber, and fluid pressure control means through which fluid is applied to close the first relief valve against the pressure in the valve opening chamber and to open the second relief valve against the pressure in the valve closing chamber.

7. In a fluid distributing system the combination of a conduit equipped with a main pressure operated valve including valve opening and valve closing pressure chambers, a first pressure operated relief valve controlling a pressure relief connection communicating with the valve opening chamber, a second pressure operated relief valve controlling a pressure relief connection communicating with the valve closing chamber and means for controlling the operation of said pressure relief valves including a pilot valve for controlling the flow of operating fluid to and from the first relief valve and a distributing valve controlling the flow of operating fluid to and from the second relief valve, and means for operating said pilot valve in accordance with pressure or flow conditions in said conduit.

8. A fluid distributing system as set forth in claim 7 wherein the pilot valve operates directly in response to variations in the flow or pressure conditions in the conduit to control the opening and closing of the first relief valve and wherein the distributing valve is mechanically actuated from the main valve and cooperates with the pilot valve to control the opening and closing of the second relief valve.

9. In a fluid distributing system the combination of a conduit equipped with a main pressure operated valve including valve opening and valve closing pressure chambers, a first relief valve controlling a pressure relief connection communicating with the valve opening chamber, a second relief valve controlling a pressure relief connection communicating with the valve closing chamber and control means for closing the first relief valve and opening the second relief valve to effect an opening movement of the main valve, said control means being also operable to close the second relief valve and to open the first relief valve to effect a closing movement of the main valve, and means for varying the rate at which the main pressure valve is moved to its open or closed position and for slowing down the rate of travel of the main valve during the final part of its closing movement.

10. In a fluid distributing system the combination of a conduit equipped with a main pressure operated valve including valve opening and valve closing pressure chambers, a first relief valve controlling a pressure relief connection communicating with the valve opening chamber, a second relief valve controlling a pressure relief connection communicating with the valve closing chamber and control means for closing the first relief valve and opening the second relief valve to effect an opening movement of the main valve, said control means being also operable to close the second relief valve and to open the first relief valve to effect a closing movement of the main valve, and means actuated by the main valve during its closing movement for throttling the flow of operating fluid into the valve closing chamber whereby the travel of the valve is decelerated during the final part of the closing movement.

11. A fluid distributing system as set forth in claim 1 in which the automatic control means includes a first pressure relief valve associated with the valve opening chamber and normally tending to open in response to the pressure in said chamber, a second pressure relief valve associated with the valve closing chamber and normally tending to close in response to the pressure in said chamber, and fluid pressure control means through which fluid is supplied to close the first relief valve against the pressure in the valve opening chamber and to open the second relief valve against the pressure in the valve closing chamber.

12. In a fluid distributing system the combination of a conduit equipped with a main pressure operated valve including valve opening and valve closing pressure chambers, a first pressure operated relief valve controlling a pressure relief connection communicating with the valve opening chamber, a second pressure operated relief valve controlling a pressure relief connection communicating with the valve closing chamber, and means for controlling the operation of said pressure relief valves including a pilot valve for controlling the flow of operating fluid to and from the first relief valve and a distributing valve controlling the flow of operating fluid to and from the second relief valve, and a solenoid controlling the operation of said pilot valve.

13. In a fluid distributing system the combination of a conduit equipped with a main pressure operated valve including valve opening and valve closing pressure chambers, a first relief valve controlling a pressure relief connection communicating with the valve opening chamber, a second relief valve controlling a pressure relief connection communicating with the valve closing chamber, means, including a pilot valve and a distributing valve, for controlling the flow of operating fluid to and from said relief valves, means for operating said pilot valve and a cam for operating the distributing valve, said cam being actuated by the main valve.

14. In a fluid distributing system as set forth in claim 13, means cooperating with said cam to control the flow of fluid from the conduit into said valve closing chamber.

15. In a fluid distributing system the combination of a conduit equipped with a main pressure operated valve including valve opening and valve closing pressure chambers, a first pressure relief valve associated with the valve opening chamber and normally tending to open in response to the pressure in said chamber, a second pressure relief valve associated with the valve closing chamber and normally tending to close in response to the pressure in said chamber, a pressure space associated with each relief valve in which pressure is alternately established and relieved to control the operation of said valve, a pilot valve, a pressure supply line adapted to be connected with the pressure spaces of the relief valves in one position of the pilot valve, a pressure relief line adapted to be connected with the pressure spaces of the relief valves in another position of the pilot valve, a distributing valve controlling a fluid passage connecting the pressure spaces of the relief valves, a further pressure relief connection for the pressure space of the second relief valve adapted to be placed in communication with said space in one position of the distributing valve, and means actuated by the main valve for controlling the position of the distributing valve.

16. A fluid distributing system as set forth in claim 15 in which the last mentioned means comprises a rotatable cam engaging the distributing valve and means for rotating said cam in response to the movements of the main valve.

17. A fluid distributing system as set forth in claim 15 in which the last mentioned means controls the flow of fluid from the conduit into the valve closing chamber.

18. A fluid distributing system as set forth in claim 15 in which the last mentioned means serves to throttle the flow of operating fluid from the conduit into the valve closing chamber so that the travel of the main valve is decelerated during the final part of its closing movement.

19. A fluid distributing system as set forth in claim 15 in which the last mentioned means includes a hollow rotary shaft driven by the main valve and forming a fluid conduit communicating with the valve closing chamber, a cam fixed to said shaft and engaging the distributing valve, a chamber to which fluid is supplied from said conduit and a valve member carried by said cam and serving to control the flow of fluid from said last mentioned chamber into said hollow shaft.

HUGH W. MACPHERSON.